United States Patent Office 3,369,965
Patented Feb. 20, 1968

3,369,965
PRESERVATION OF WOOD
Everett E. Gilbert, Morristown, N.J., assignor to Allied Chemical Corporation, New York, N.Y., a corporation of New York
No Drawing. Filed Mar. 4, 1965, Ser. No. 437,292
12 Claims. (Cl. 167—31)

This invention relates to new chemical compositions and use thereof for preserving wood and similar cellulosic materials subject to attack by decay, mold fungi and termites as well as other microorganisms and insect pests. More particularly, the present invention pertains to the use of compositions containing a ketonic compound having the empirical formula $C_{10}Cl_{10}O$ and to a composition comprising, in combination, said ketonic compound and a compound which may be either pentachlorophenol or cresote, for the protection of wood buried in the soil from rot and termites.

The ketonic compound of the present novel compositions is a complex chlorinated polycyclic ketone having the structural formula:

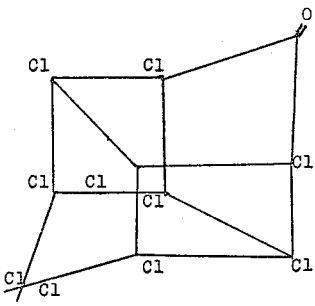

which has been designated as decachlorooctahydro-1,3,4-metheno-2H-cyclobuta(cd)pentalen - 2 - one. This compound is a white crystalline solid having a molecular weight of 490.68 and sublimes with some decomposition when heated in the open atmosphere to 300° C.

The ketonic compound may be conveniently prepared by condensing two molecules of hexachlorocyclopentadiene with the aid of sulphur trioxide to form a hexachlorocyclopentadiene reaction product and hydrolyzing the reaction product.

The attack of wood by termites and fungi has been a serious problem. Among the most common offenders are dry wood termites of the genera Kalotermes, soil-inhabiting termites represented by the genera Reticulitermes and Heterotermes, damp wood termites of the genera Zootermopsis and decay organisms such as *Lenzites trabea* and *Poria incrassata*. To combat attack of these and similar noxious organisms, it has been proposed to protect wood by dipping, spraying, impregnating or otherwise applying thereto a suitable substance which has the property of being toxic to or of inhibiting attack by termites and the growth of decay organisms. Although numerous substances have been proposed as wood preservatives in the past, effective control of any one of the above classes of termites cannot be predicted, even though some other class of termite has been successfully controlled by application of such a substance to the wood sought to be preserved. Soil-inhabiting termites differ so greatly in their habits and especially in their habitat that chemicals effective against dry wood termites, for example, are not applicable to wood buried in the soil which is susceptible to attack by soil-inhabiting termites.

The soil-inhabiting termites are found in practically every part of the United States and are responsible for a great majority of the damage incurred to wood structures by termites. These termites are by nature earth dwelling, entering wood only from the ground and require a continuous supply of moisture for their existence. Since they work essentially from the earth, these insects cause the greatest structural weakening from the ground line of poles, posts, towers, bridge timbers, etc. and in the foundation members of buildings where strength requirements are most exacting. Although numerous substances have been suggested and used in the past to control this class of termite, many disadvantages have accompanied use of these heretofore known wood preservatives. Compositions containing oxides of arsenic or sodium fluorosilicate, for example, are so toxic that great care must be taken not to endanger human lives with these poisons. Preservatives containing copper are detoxified under outdoor exposure and in some instances impart an unpleasant odor, thus rendering the wood impregnated with these preservatives unsuitable where foods sensitive to odors may be stored. Other toxic substances such as copper sulfate and mercuric chloride corrode metals in contact with the wood sought to be preserved.

Accordingly, it is an object of the present invention to provide new and more effective compositions for inhibiting attack of wood by soil-inhabiting termites and preventing rot without the accompanying shortcomings of the prior art preservatives.

It is a further object to provide new compositions whic have exceptionally high toxicity against soil-inhabiting termites and decay organisms and which retain their protective action over long periods of time.

A still further object of the present invention is to provide a method of treating wood to prevent rot and attack by soil-inhabiting termites.

It has been unexpectedly found that compositions containing the ketonic compound, decachlorooctahydro-1,3,4-metheno-2H-cyclobuta(cd)pentalene - 2 - one, and compositions comprising mixtures of said ketonic compound with a second protective material, in particular either pentachlorophenol or creosote, when dissolved in an inert organic solvent therefor, exhibit exceptionally effective inhibition of attack by soil-inhabiting termites as well as the decay organisms, mold and mildew. More particularly, it has been found that the present compositions provide greater long-range protection against all varieties of soil-inhabiting termites including subterranean termites, desert termites, mound-building termites and carton nest-building termites, as well as inhibition of growth of decay fungi, than any commercial preservative presently available.

It has been further surprisingly discovered that preservative compositions comprising a solution of the ketonic compound and pentachlorophenol and solutions comprising a solution of the ketonic compound and creosote exhibit synergistic activity in preventing attack of wood by earth-dwelling termites and rot.

The ketonic compound constituting the active ingredient of the present invention may be present in anhydrous form or as a technical hydrate containing up to about 13 percent of water. In either the anhydrous or hydrate form the ketonic compound is very soluble in many organic solvents such as lower aliphatic alcohols, ethers and ketones, but is virtually insoluble in cold water and in largely aqueous systems and only slightly soluble (less than 0.4 percent) in boiling water.

The pentachlorophenol employable in the present compositions may be present in pure form or as a technical compound. Pentachlorophenol, meeting the requirements of federal specification TT–W–570 of June 20, 1947, is especially suitable in the compositions contemplated herein. This specification requires that pentachlorophenol shall contain not less than 95 percent chlorinated phenols determined by titration of hydroxyl group and calculated as pentachlorophenol when tested as described. It is also required that the matter insoluble in sodium hydroxide solution shall not exceed 1 percent and that the freezing point shall be not lower than 174.0° C.

The creosote employable herein may be derived from any convenient source. Coal-tar, lignite-tar, oil-tar, water-gas-tar and wood-tar creosotes are all suitable as active ingredients in the present compositions. Coal-tar creosotes are especially preferred due to their relative insolubility in water, low volatility, ease of application, general availability and relatively low cost. Any coal-tar creosote meeting the requirements of the standard specification (P1–54) of the American Wood Preservers Association give generally satisfactory results.

The novel compositions of the present invention are prepared by simply dissolving the ketonic compound, or mixtures of the ketonic compound and pentachlorophenol or creosote, in any suitable inert organic solvent. The compositions may then be applied to the wood sought to be preserved in any conventional manner. The process selected to impregnate the wood with the present composition is obviously dependent upon the degree of penetration and amount of retention (solution uptake) desired. These processes may be effected by impregnating the preservative solution into the wood under pressure in closed cylinders or by non-pressure methods such as by dipping, steeping or soaking the wood sought to be preserved in the preservative solution or by brushing or spraying the wood with the preservative solution. In general, pressure treatments afford a deeper and more uniform penetration and a higher absorption of preservative and thus provide a more effective protection to the wood. In addition, treating conditions in pressure treatments may be so controlled that retention and penetration can be varied to meet the requirements of service, thus resulting in more economical use of preservative. Typical pressure treatments employable pursuant to the present invention include the full-cell process when maximum quantities of preservative solution are required to be impregnated into the wood and the empty-cell process when deep penetration accompanied by limited final retention of preservative solution is desired.

The conditions used in applying the preservative solutions onto the wood are not critical. The adequacy of the treatment in each case is determined by the amount of preservative absorbed and retained by the wood, the depth to which it has penetrated and the distribution of preservative throughout the treated zone, and these factors vary with the specific uses to be made of the wood. Operable temperatures normally range from room temperature up to about 212° F. for pressure as well as nonpressure treatments, although temperatures above 212° F. may be used in pressure treatments. Satisfactory results may be readily obtained at pressures up to about 250 p.s.i. when pressure treatments are employed. Immersion times for the treatments may range from a few minutes up to several days. To insure adequate long-range protection against the soil-inhabiting termites and rot the compositions of the present invention are generally impregnated into the wood to retention levels of at least about 5 pounds per cubic foot. The wood is completely impregnated, with even distribution throughout, with the compositions of the present invention for best results.

The solvents which are useful for purposes of formulating the compositions of the present invention include light and heavy petroleum fuel oils, aromatic coal-tar solvents, oils of essential aromatic character or any other oil that is capable of dissolving sufficient quantities of the active ingredient, capable of impregnating the wood to be treated to the desired degree and is resistant to being readily displaced or leached by water. In general, petroleum oils corresponding to fuel oils number 1 to 3 according to ASTM D 396 are effective when non-pressure treatments are employed in the treatment of the wood. Petroleum oils having a specific gravity not greater than 35 A.P.I. at 60° F., with a viscosity not greater than 70 Saybolt Universal seconds at 100° F., an ASTM flashpoint of not less than 175° F. and an ASTM distillation range such that not more than 50 percent by volume is distilled below 500° F. and not more than 90 percent by volume is distilled below 600° F. are acceptable when pressure treatments of the wood are desired. Mixtures of the above solvents may also be employed. The use of an auxiliary solvent is also contemplated, for example, to aid in the dissolution of the active ingredient when the primary solvent is incapable of dissolving the desired quantity of the active ingredient.

Solution concentrations of the active ingredient dissolved in the solvent have not been proven to be critical, provided an effective minimum amount of such ingredient is initially employed. A typical minimum concentration of the active ingredient dissolved in the solvent resulting in improved protection to wood exposed to attack by soil-inhabiting termites and decay organisms is about 1 percent by weight of the solvent. The maximum concentration of active ingredient employable is limited only by its solubility in the particular solvent used. In general, no increased benefit has been derived by increasing the concentration of the active ingredient to above about 25 percent based on the weight of the solvent. Since each of the active ingredients of the present invention is virtually insoluble in water while being extremely soluble in the solvent, the preferential loss of these active ingredients by leaching is kept to a minimum, and protection is afforded to the wood at minimum concentrations so long as the solvent itself has not been displaced with water or completely leached. Furthermore, since the active ingredients of the present invention are not detoxified or fixed chemically in the interior of the wood when exposed to the elements, minimum concentrations of these active ingredients have proved to be eminently satisfactory to obtain the desired improved results.

When the ketonic compound is used in combination with pentachlorophenol or creosote, the proportions of these active ingredients used in preparing the compositions of the invention may also be varied. The weight ratio of the ketonic compound to the second preservative material may vary from 2:1 to 1:5, but ordinarily the ketonic compound will preferably be present in a proportion equal to that of the second preservative material. Compositions wherein the ketonic compound and pentachlorophenol or creosote are present in a minimum total concentration of 5 percent by weight of the solvent have been found to exhibit outstanding activity for inhibiting attack by the soil-inhabiting termites and decay fungi.

The compositions of the present invention have been found to be effective when applied to seasoned or otherwise conditioned wood. The nature of the wood treatable to obtain the desired improvement is of no consequence, and woods both hard and soft obtained from various geographical locations may be suitably treated to realize effective inhibition of attack by soil-inhabiting termites and growth of decay organisms. Southern pine and Douglas fir, two native woods upon which major dependence has been placed as a source for ties, poles and structural timers are typical examples of woods treatable in accordance with the present invention.

The prolonged termite attack-inhibiting and rot-preventing characteristics of my new compositions are indicated in the following examples.

*Example I*

Clean, white pine wooden stakes (2 x 4 x 18 inches) were impregnated with treating solutions by the method of Zabel and Moore (Forest Products Journal, vol. 8, No. 9, pps. 258–259 (1958)) using the "dip treatment" method for ten minutes. The solutions were made up using an aromatic coal-tar solvent having a boiling range of 150–250° C., a flash point of 87° F., a specific gravity of 0.8734, and an aromatic content of 98.8 percent. Technical decachlorooctahydro-1,3,4-metheno-2H-cyclobuta (cd) pentalen-2-one (88 percent active), technical pentachlorophenol (95 percent assay chlorinated phenols) and coal-tar creosote meeting specification P1–54 of the American Wood Preservers' Association Manual of Recommended Practice were used as the additives in the preparation of the preservative solutions. All stakes were immersed for ten minutes in the solution at room temperature using a wire cage and were then air-dried at room temperature for one week.

The stakes were placed in loamy soil to a depth of 9 inches to determine the effectiveness of the toxicants tested to prevent soil-inhabiting termite attack and decay. The test area was Florida flatland soil consisting of fine sand and some organic matter overlaying hard pan 12 to 18 inches below. The ground cover consisted of grass, palmetto and pine in an uncultivated wooden area. The stakes were removed from the ground after the time period indicated and, after being allowed to dry for a short period, all adhering earth was scraped therefrom with a dull knife. The results of the preservative solutions tested are as follows:

TABLE I

| Preservative | Concentration[1] | No. of Stakes Treated | Average Percent Damage to Stakes | | |
|---|---|---|---|---|---|
| | | | After 12 mos. of Exposure | After 18 mos. of Exposure[4] | After 30 mos. of Exposure |
| Ketonic Compound | 5.0 | 15 | 1.0 | 7.0 | 43.3 |
| Ketonic Compound+Pentachlorophenol[2] | 5.0 | 15 | 0.5 | 2.8 | 10.6 |
| Ketonic Compound+Creosote[2] | 5.0 | 15 | 2.3 | 1.0 | 20.3 |
| Pentachlorophenol[3] | 5.0 | 15 | 3.2 | 15.0 | 34.8 |
| Creosote[3] | 5.0 | 15 | 8.2 | 15.5 | 56.4 |
| Solvent Check | | 15 | 10.1 | 23.0 | 76.5 |

[1] All percent concentrations are calculated on a weight basis; toxicant concentrations are expressed in terms of active toxicant present.
[2] Equivalent weight amounts of toxicants employed.
[3] Commercially available wood preservative.
[4] Rating of four sets of stakes.

It is evident from the results shown that the compositions containing the ketonic compound of the present invention are at least as toxic or more toxic to soil-inhabiting termites and decay organisms at equivalent dosages than known oil-soluble wood preservatives. These results also demonstrate that compositions containing the ketonic compound and pentachlorophenol and compositions containing the ketonic compound and creosote exhibit synergistic activity in preventing rot and inhibiting attack of wood by soil-inhabiting termites.

*Example II*

Clean, white pine wooden stakes were impregnated with preservative solutions in the manner described in the preceding example and were placed in New Jersey sandy-loamy soil to a depth of 9 inches to determine the effectiveness of the toxicants to inhibit attack by soil-inhabiting termites. The stakes were removed from the ground after 30 months of exposure and were examined for termite attack. A summary of the condition of the stakes is reproduced below:

Examination of the stakes, as is reflected in the above table, revealed that injury by soil-inhabiting termites was quite evident in the untreated check plot while all stakes treated with the preservative compositions of the present invention were in good condition after being in the soil for a period of 30 months.

The compositions contemplated herein may be modified, if desired, by the addition thereto of varying amounts of water repellents, wetting agents, bloom suppressants, penetration assistants or other materials having a favorable action on the impregnation or penetration of the compositions or for a desirable action in further protecting the treated article.

While in the foregoing specification this invention has been described in relation to certain specific embodiments thereof and details have been set forth for the purpose of illustration, it may be apparent to those skilled in the art that the invention is adaptable to other embodiments and many of the details set forth herein may be varied considerably without departing from the basic concept of the invention.

I claim:
1. A composition for inhibiting attack of wood by soil-inhabiting termites and preventing rot comprising as active ingredient a mixture of (1) decachlorooctahydro-1,3,4-metheno-2H-cyclobuta(cd)pentalen-2-one and (2) a material selected from the group consisting of pentachlorophenol and creosote, the weight ratio of (1):(2) ranging from 2:1 to 1:5, said active ingredient being dissolved in an inert organic solvent therefor.

2. A composition as defined in claim 1 wherein the solvent is an aromatic coal-tar.

3. A composition as defined in claim 1 wherein the solvent is a petroleum fuel oil.

4. The method of treating wood to inhibit attack by soil-inhabiting termites and prevent rot which comprises treating said wood with an inert organic solvent containing dissolved therein as active ingredient a material selected from the group consisting of decachlorooctahydro-1,3,4-metheno-2H-cyclobuta(cd)pentalen-2-one and mixtures of (1) decachlorooctahydro-1,3,4-metheno-2H-cyclobuta(cd)pentalen-2-one and (2) a material selected

TABLE II

| Preservative | Concentration[1] | No. of Stakes Treated | No. of Stakes in Classification[2] | | | | | |
|---|---|---|---|---|---|---|---|---|
| | | | 0 | 1 | 2 | 3 | 4 | 5 |
| Ketonic Compound | 5.0 | 15 | 14 | | 1 | | | |
| Ketonic Compound+Pentachlorophenol[3] | 5.0 | 15 | 15 | | | | | |
| Ketonic Compound+Creosote[3] | 5.0 | 15 | 14 | 1 | | | | |
| Untreated Check | | 15 | 3 | 6 | 1 | 4 | [4]1 | |

[1] All percent concentrations are calculated on a weight basis; toxicant concentrations are expressed in terms of active toxicant present.
[2] The rating system used in this work is: 0—No termite damage; 1—a trace or etching of the surface; 2—light injury—tunnelled to ½ inch; 3—moderate attack—tunnelled 2-3 inches; 4—heavy attack—up to ⅔ of stake destroyed; 5—very heavy attack—between ⅞ and complete destruction.
[3] Equivalent weight amounts of toxicants employed.
[4] Three of these stakes had active colonies.

from the group consisting of pentachlorophenol and creosote, the weight ratio of (1):(2) ranging from 2:1 to 1:5.

5. Method of claim 4 wherein the active ingredient is decachlorooctahydro - 1,3,4 - metheno-2H-cyclobuta(cd) pentalen-2-one.

6. Method of claim 4 wherein the solvent is an aromatic coal-tar.

7. Method of claim 4 wherein the solvent is a petroleum fuel oil.

8. Method of claim 4 wherein said active ingredient is present in a concentration of at least 1 percent based on the weight of the solvent.

9. A composition for inhibiting attack of wood by soil-inhabiting termites and preventing rot comprising as active ingredient a mixture of (1) decachlorooctahydro-1,3,4-metheno-2H-cyclobuta(cd)pentalen-2-one and (2) pentachlorophenol, the weight ratio of (1):(2) ranging from 2:1 to 1:5, dissolved in an inert organic solvent therefor.

10. A composition for inhibiting attack of wood by soil-inhabiting termites and preventing rot comprising as active ingredient a mixture of (1) decachlorooctahydro-1,3,4 - metheno-2H-cyclobuta(cd)pentalen-2-one and (2) creosote, the weight ratio of (1):(2) ranging from 2:1 to 1:5, dissolved in an inert organic solvent therefor.

11. The method of treating wood to inhibit attack by soil-inhabiting termites and preventing rot which comprises treating said wood with an inert organic solvent containing dissolved therein as active ingredient a mixture of (1) decachlorooctahydro-1,3,4-metheno-2H-cyclobuta(cd)pentalen-2-one and (2) pentachlorophenol, the weight ratio of (1):(2) ranging from 2:1 to 1:5.

12. The method of treating wood to inhibit attack by soil-inhabiting termites and preventing rot which comprises treating said wood with an inert organic solvent containing dissolved therein as active ingredient a mixture of (1) decachlorooctahydro-1,3,4-metheno-2H-cyclobuta(cd)pentalen-2-one and (2) creosote, the weight ratio of (1):(2) ranging from 2:1 to 1:5.

References Cited
UNITED STATES PATENTS

| | | | |
|---|---|---|---|
| Re. 24,749 | 12/1959 | Gilbert et al. | 167—30 |
| 2,180,142 | 11/1939 | Fox et al. | 167—38.7 |
| 2,904,467 | 9/1959 | Behr | 167—38.7 |
| 3,055,948 | 9/1962 | Hoch et al. | 167—30 X |
| 3,096,239 | 7/1963 | Hoch et al. | 167—30 |

FOREIGN PATENTS 147,346  7/1952  Australia.

JOSEPH SCOVRONEK, *Primary Examiner.*

F. W. BROWN, *Assistant Examiner.*